US012047631B2

(12) United States Patent
Walker et al.

(10) Patent No.: US 12,047,631 B2
(45) Date of Patent: *Jul. 23, 2024

(54) NETWORK RECORDER BUFFER

(71) Applicant: Comcast Cable Communications, LLC, Philadelphia, PA (US)

(72) Inventors: Todd Walker, Destin, FL (US); Bruce Bradley, Wayne, PA (US); Thomas Day, West Chester, PA (US); Robert Gaydos, Harleysville, PA (US); John Leddy, Bryn Mawr, PA (US); Weidong Mao, West Windsor, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/861,501

(22) Filed: Apr. 29, 2020

(65) Prior Publication Data
US 2020/0329269 A1 Oct. 15, 2020

Related U.S. Application Data

(63) Continuation of application No. 15/957,392, filed on Apr. 19, 2018, now Pat. No. 10,764,628, which is a
(Continued)

(51) Int. Cl.
*H04N 21/426* (2011.01)
*H04N 21/274* (2011.01)
(Continued)

(52) U.S. Cl.
CPC ......... *H04N 21/426* (2013.01); *H04N 21/274* (2013.01); *H04N 21/2747* (2013.01);
(Continued)

(58) Field of Classification Search
CPC .... H04N 5/782; H04N 5/76; H04N 21/47214; H04N 5/781; H04N 5/85
(Continued)

(56) References Cited

U.S. PATENT DOCUMENTS 8,843,975 B2 * 9/2014 Meuninck .......... H04N 21/4334
725/91
2002/0174430 A1 * 11/2002 Ellis .................... H04N 21/4753
386/230
(Continued)

OTHER PUBLICATIONS

Extended European Search Report—EP 12171897.7—Mailing date: Jul. 18, 2013.
(Continued)

*Primary Examiner* — Daniel T Tekle
(74) *Attorney, Agent, or Firm* — Banner & Witcoff, Ltd.

(57) ABSTRACT

A network digital video recording (nDVR) system may take into account the capabilities of a requesting user's local DVR when managing network recordings. The user's local DVR may include a temporary buffer that is normally used to record what the DVR is tuned to, and may be used for local trickplay functionality such as pausing live television. The nDVR features described herein may track the usage of the user's temporary DVR buffer, and use that in determining what to stream in response to a user's playback request. The nDVR system can also determine if the user's local DVR has an unused tuner at a time of a program recording, and can instruct the user's local DVR to also tune to the program.

47 Claims, 7 Drawing Sheets

Related U.S. Application Data continuation of application No. 13/164,285, filed on Jun. 20, 2011, now Pat. No. 9,998,783.

(51) Int. Cl.
*H04N 21/2747* (2011.01)
*H04N 21/4147* (2011.01)
*H04N 21/6543* (2011.01)

(52) U.S. Cl.
CPC ..... *H04N 21/4147* (2013.01); *H04N 21/4263* (2013.01); *H04N 21/6543* (2013.01)

(58) Field of Classification Search
USPC ........................................................ 386/238
See application file for complete search history.

(56) References Cited

U.S. PATENT DOCUMENTS

| | | | |
|---|---|---|---|
| 2005/0002640 A1 | 1/2005 | Putterman et al. | |
| 2005/0262534 A1* | 11/2005 | Bontempi | H04N 5/76 725/94 |
| 2007/0104456 A1 | 5/2007 | Craner | |
| 2008/0163330 A1* | 7/2008 | Sparrell | H04M 11/007 348/E7.071 |
| 2009/0178098 A1 | 7/2009 | Westbrook et al. | |
| 2010/0074600 A1* | 3/2010 | Putterman | H04N 21/274 386/241 |
| 2010/0247067 A1* | 9/2010 | Gratton | H04N 21/4325 386/291 |
| 2011/0113122 A1 | 5/2011 | Drope | |
| 2012/0233652 A1* | 9/2012 | Drope | H04N 21/6175 725/114 |

OTHER PUBLICATIONS

Apr. 27, 2017—Canadian Office Action—CA 2,779,744.
Apr. 5, 2019—Canadian Office Action—CA 2,779,744.
Mar. 11, 2020—Canadian Office Action—CA 2,779,744.
Mar. 18, 2021—Canadian Office Action—CA 2,779,744.
Jan. 21, 2022—Canadian Office Action—2,779,744.

\* cited by examiner

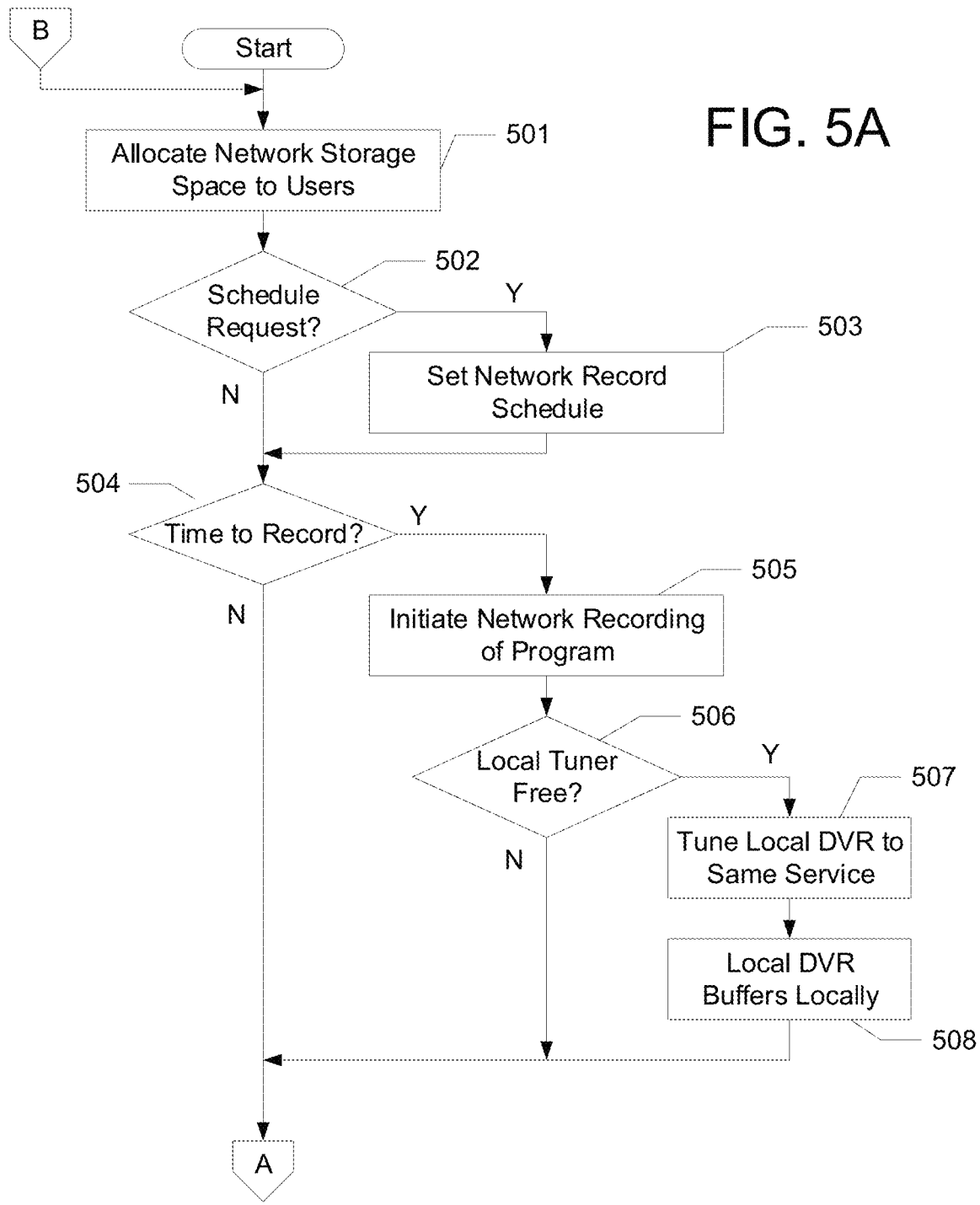

NETWORK RECORDER BUFFER

CROSS-REFERENCE TO RELATED APPLICATIONS

This application is a continuation of U.S. application Ser. No. 15/957,392, filed Apr. 19, 2018, which is a continuation of U.S. patent application Ser. No. 13/164,285, filed Jun. 20, 2011, now U.S. Pat. No. 9,998,783, all of which are hereby incorporated by reference in their entireties.

BACKGROUND

Viewers have grown accustomed to using their digital video recorders (DVRs) to record shows to watch later. Early DVRs store recorded programs locally in hard drives, providing users with the option to playback recorded programs from the hard drive at their own leisure. Some systems offer network DVR functionality, in which the storage occurs at a networked storage device, remote from the user's home.

Such networked DVRs (nDVRs) can help reduce costs of manufacturing the interface device that a user uses to access the recorded content, by reducing the amount of local storage needed. But nDVRs may place an increased burden on a data transmission network. As more and more users rely on nDVRs for managing their content, more and more data will need to flow across the networks, placing a strain on the network's bandwidth and other aspects.

Accordingly, there remains an ever-present need to offer users convenience in their recording options, and to balance that need with the strains on the network.

SUMMARY

Features described herein relate generally to storage of content and network digital video recording (nDVR) services. In some embodiments, an nDVR server may receive a request to record in the network (e.g., at an nDVR storage), and at the time content is transmitted or available, it is recorded in the nDVR. Additionally, the nDVR server can determine if the user has a DVR that includes a temporary buffer configured to automatically record content (e.g., to support pausing "live" video), and if the user's DVR has an available unused tuner. If the user's DVR has such an available tuner, the nDVR server may instruct the DVR to also tune to the user's requested content. Accordingly, at least some of the requested content may be recorded on both the nDVR storage and the user's local DVR's temporary buffer.

If the user requests playback of content from the nDVR storage, the nDVR server may determine whether any of the content is available in the user's own local DVR temporary buffer. If such content is available in the user's temporary buffer, the nDVR server can instruct the user's DVR to use its temporary buffer for playback, and can provide a separate stream with additional portions of the content from the nDVR storage, as needed.

If the request is received while the content is in-progress, the nDVR server may determine how much program playback time remains before the current time of the live transmission of the content, and can compare this time with the size of the DVR's temporary buffer. The size comparison can be used to determine when to switch the user's playback from the local DVR temporary buffer to the nDVR storage (or vice versa).

This summary is not intended to identify critical or essential features of the disclosures herein, but instead merely summarizes certain features and variations thereof. Other details and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements.

FIGS. 5A-C illustrate an example network recording method.

DETAILED DESCRIPTION

Figure 1:
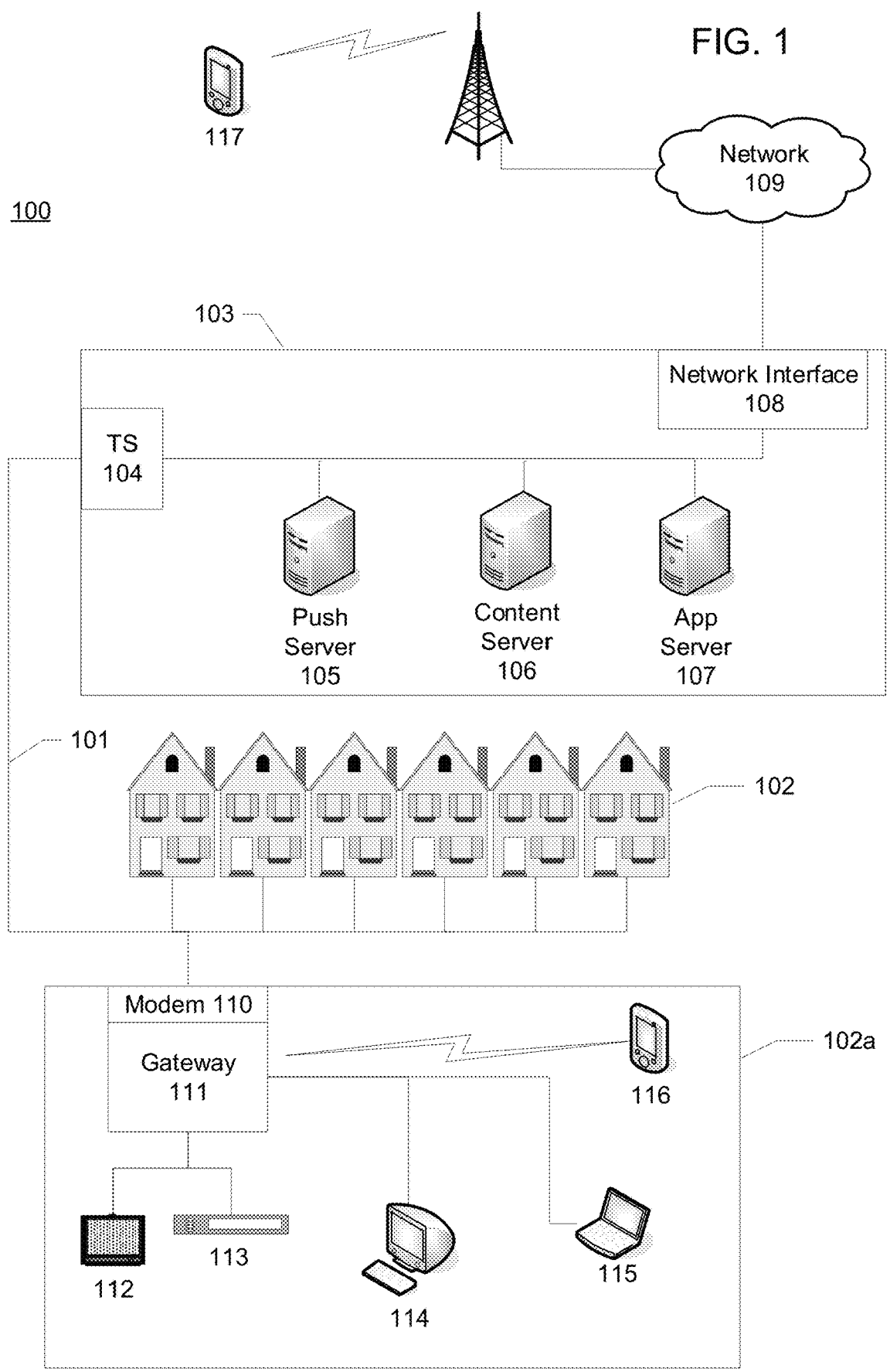
FIG. 1 illustrates an example network.

FIG. 1 illustrates an example information distribution network 100 on which many of the various features described herein may be implemented. Network 100 may be any type of information distribution network, such as satellite, telephone, cellular, wireless, etc. One example may be an optical fiber network, a coaxial cable network or a hybrid fiber/coax distribution network. Such networks 100 use a series of interconnected communication lines 101 (e.g., coaxial cables, optical fibers, wireless, etc.) to connect multiple homes 102 to a central office or headend 103. The headend 103 may transmit downstream information signals onto the lines 101, and each home 102 may have a receiver used to receive and process those signals.

There may be one line 101 originating from the central office 103, and it may be split a number of times to distribute the signal to various homes 102 in the vicinity (which may be many miles) of the central office 103. The lines 101 may include components not illustrated, such as splitters, filters, amplifiers, etc. to help convey the signal clearly, but in general each split introduces a bit of signal degradation. Portions of the lines 101 may also be implemented with fiber-optic cable, while other portions may be implemented with coaxial cable, other lines, or wireless communication paths. By running fiber optic cable along some portions, for example, signal degradation in those portions may be significantly minimized, allowing a single central office 103 to reach even farther with its network of lines 101 than before.

The central office 103 may include a termination system (TS) 104, such as a modem termination system (MTS), which may be a computing device configured to manage communications between devices on the network of lines 101 and backend devices such as servers 105-107 (to be discussed further below). The MTS may be as specified in a standard, such as the Data Over Cable Service Interface Specification (DOCSIS) standard, published by Cable Television Laboratories, Inc. (a.k.a. CableLabs), or it may be a similar or modified device instead. The MTS may be configured to place data on one or more downstream frequencies to be received by modems at the various homes 102, and to receive upstream communications from those modems on one or more upstream frequencies. The central office 103 may also include one or more network interfaces 108, which can permit the central office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the central office 103 may include a variety of servers 105-107 that may be configured to perform various functions. For example, the central office 103 may include a push notification server 105. The push notification server 105 may generate push notifications to deliver data and/or commands to the various homes 102 in the network (or more specifically, to the devices in the homes 102 that are configured to detect such notifications). The central office 103 may also include a content server 106. The content server 106 may be one or more computing devices that are configured to provide content to users in the homes. This content may be, for example, video on demand movies, television programs, songs, text listings, etc. The content server 106 may include software to validate user identities and entitlements, locate and retrieve requested content, encrypt the content, and initiate delivery (e.g., streaming) of the content to the requesting user and/or device.

The central office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the homes 102. And as will be discussed in greater detail below, another application server may be responsible for receiving user remote control commands, and processing them to provide an intelligent remote control experience.

An example home 102a may include a modem 110, which may include transmitters and receivers used to communicate on the lines 101 and with the central office 103. The modem 110 may be, for example, a coaxial cable modem (for coaxial cable lines 101), a fiber interface node (for fiber optic lines 101), or any other desired modem device. The modem 110 may be connected to, or be a part of, a gateway interface device 111. The gateway interface device 111 may be a computing device that communicates with the modem 110 to allow one or more other devices in the home to communicate with the central office 103 and other devices beyond the central office. The gateway 111 may be a set-top box (STB), digital video recorder (DVR), computer server, or any other desired computing device. The gateway 111 may also include (not shown) local network interfaces to provide communication signals to devices in the home, such as televisions 112, additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
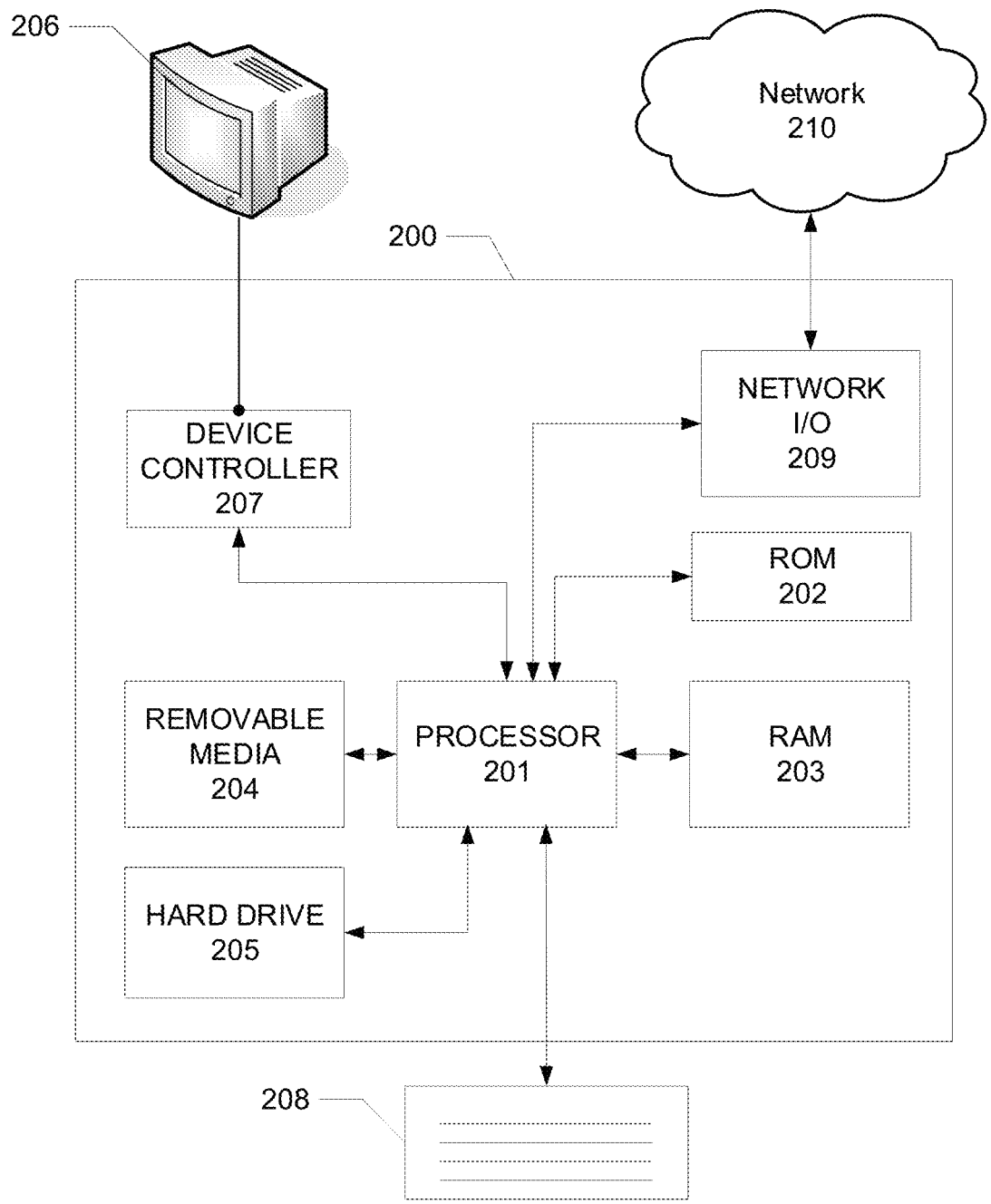
FIG. 2 illustrates an example hardware platform on which various elements described herein can be implemented.

FIG. 2 illustrates general hardware elements that can be used to implement any of the various computing devices discussed above. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication lines 101 discussed above, the external network 109, an in-home network, a provider's wireless, coaxial, fiber, or hybrid fiber/coaxial distribution system (e.g., a DOCSIS network), or any other desired network.

Various features described herein offer improved remote control functionality to users accessing content from the central office 103. For example, one such user may be a viewer who is watching a television program being transmitted from the central office 103. In some embodiments, the user may be able to control his/her viewing experience (e.g., changing channels, adjusting volume, viewing a program guide, etc.) using any networked device, such as a cellular telephone, personal computer, personal data assistant (PDA), netbook computer, etc., aside from (or in addition to) the traditional infrared remote control that may have been supplied together with a television or STB.

Figure 3:
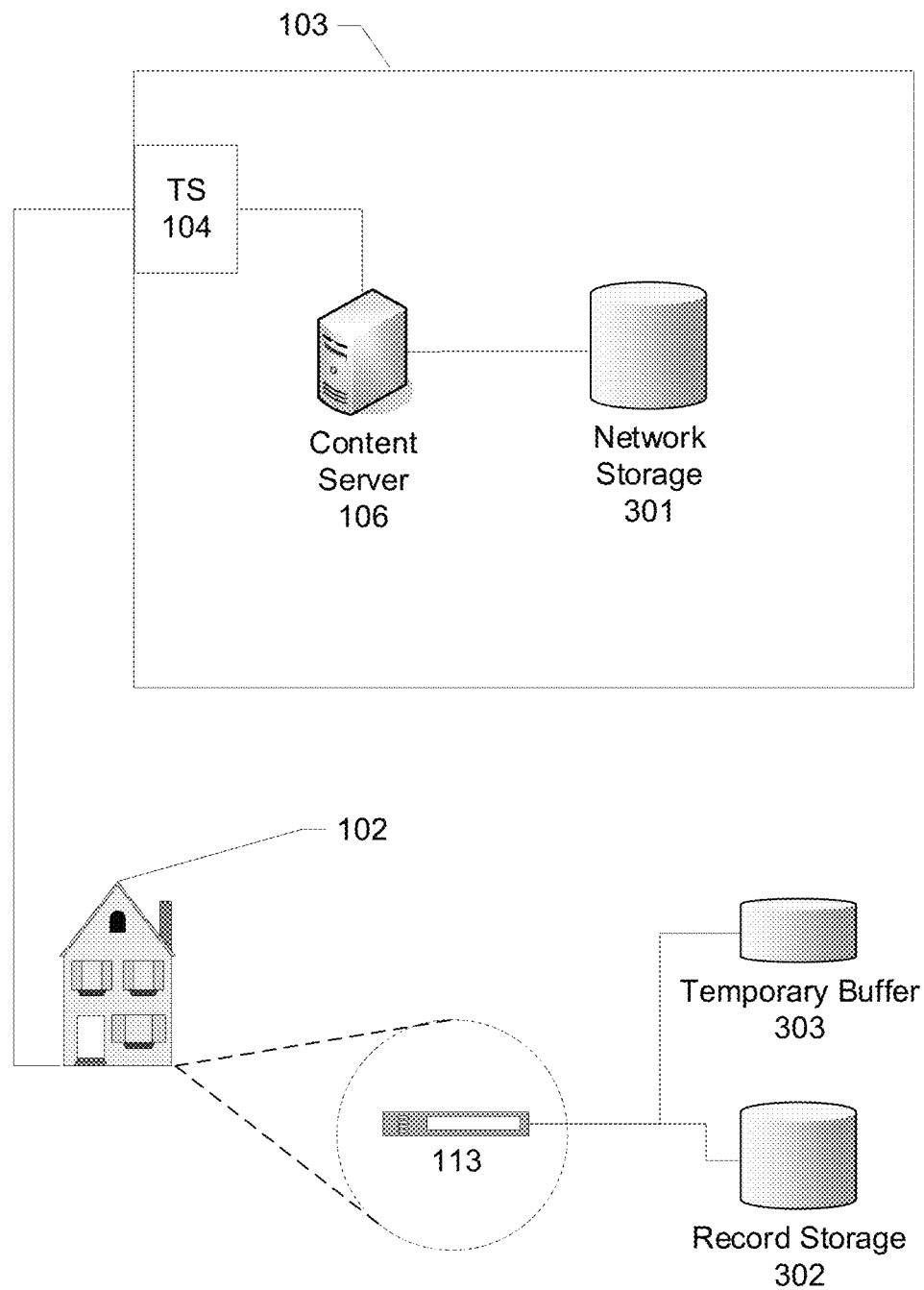
FIG. 3 illustrates an example platform and network on which various features described herein may be implemented.

FIG. 3 illustrates a simplified version of a network, such as the network 100 discussed above, to highlight some of the components used for an example embodiment in which network digital video recording (nDVR) options are provided to users. In the nDVR options, a user may select content such as video programs (e.g., linear broadcast or multicast programs, on demand programs, etc.) for recording, and the recorded content can be stored by the content server 106 (acting as an nDVR server) instead of (or in addition to, if desired) at the user's own or rented device. The FIG. 3 example shows some components illustrated in FIG. 1, and also shows network storage 301. The network storage 301 may be a high capacity memory, such as a form of hard drive or FLASH memory, or any other type of memory that can be configured for large-scale ingest and storage of content. For example, the network storage 301 may include parallel recording and reading capabilities to support thousands of simultaneous reads and writes, which can be useful if, for example, thousands of households serviced by a central office 103 all desire to record shows being transmitted on a particular evening. In use, the network storage 301 may be used by the content server 106 to store copies of the various programs that users request to store in their network DVR allotments.

At the user's home 102, the user's DVR 113 may include its own recording storage 302 that can be used to locally store programs that the user has chosen for local recording, which can be in addition to or instead of storing that content in an allotment at the network storage 301. The DVR 113 may also include a temporary buffer 303. The temporary buffer 303 can be configured to automatically record whatever content is currently being tuned by the DVR 113 or a tuner associated with the DVR 113, and can be used for local trickplay features, such as pausing live content, rewinding, etc. For example, the temporary buffer 303 may be configured to continuously record content, even if no user is watching. In some embodiments, the temporary buffer 303 can have a predetermined maximum limit (e.g., one hour of content, 1 Gb of data, etc.), and can simply contain the last hour or Gb of whatever was tuned by the tuner.

Figure 4A:
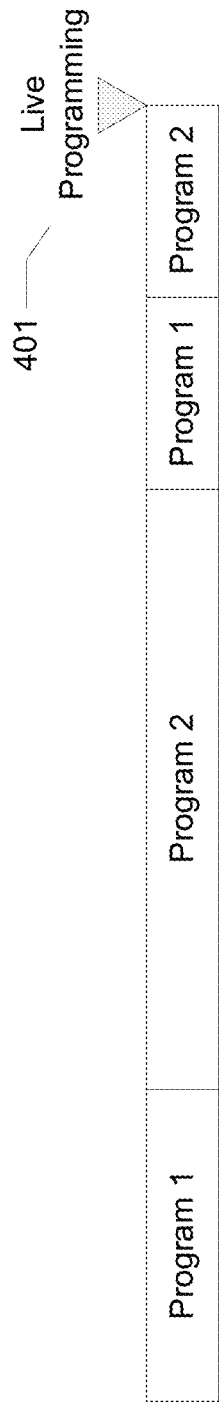
FIGS. 4A&B illustrate examples of contents of a DVR's temporary buffer.

FIG. 4A illustrates an example timeline of the content in the temporary buffer 303, showing that the viewer switched channels between two programs over the last hour, and whatever he/she watched over that last hour that is retained in the buffer 303. The live programming pointer 401 identifies a position in the buffer for content to which the DVR 113 is currently tuned, and as illustrated, over the course of the last hour the user started out watching "Program 1," then "Program 2," back to "Program 1," and is currently watching "Program 2" again. As time moves forward (towards the right in the figure), the temporary buffer 303 continues to record new content as it is being received, and overwrites the oldest content (at the far left of the figure).

Figure 4B:

In some embodiments, the temporary buffer 303 might reset itself each time the user switches between programs or changes channels, erasing itself to begin filling recording anew. FIG. 4B illustrates how a timeline for such an alternative buffer 303 might look, using the same switching between three programs as in FIG. 4A. As illustrated, the temporary buffer 303 may have reset itself the last time the user changed channels (e.g., switched to watching "Program 2"), so the buffer 303 content might only contain the portion of the latest program watched by the user (or tuned by the DVR 113) since the user last tuned to it. The other unused portions of the buffer 303 may gradually be filled if the user continues to watch "Program 2." As will be discussed further below, some embodiments herein can make use of this temporary buffer 303 to assist in management of network DVR functionality.

Figure 5B:
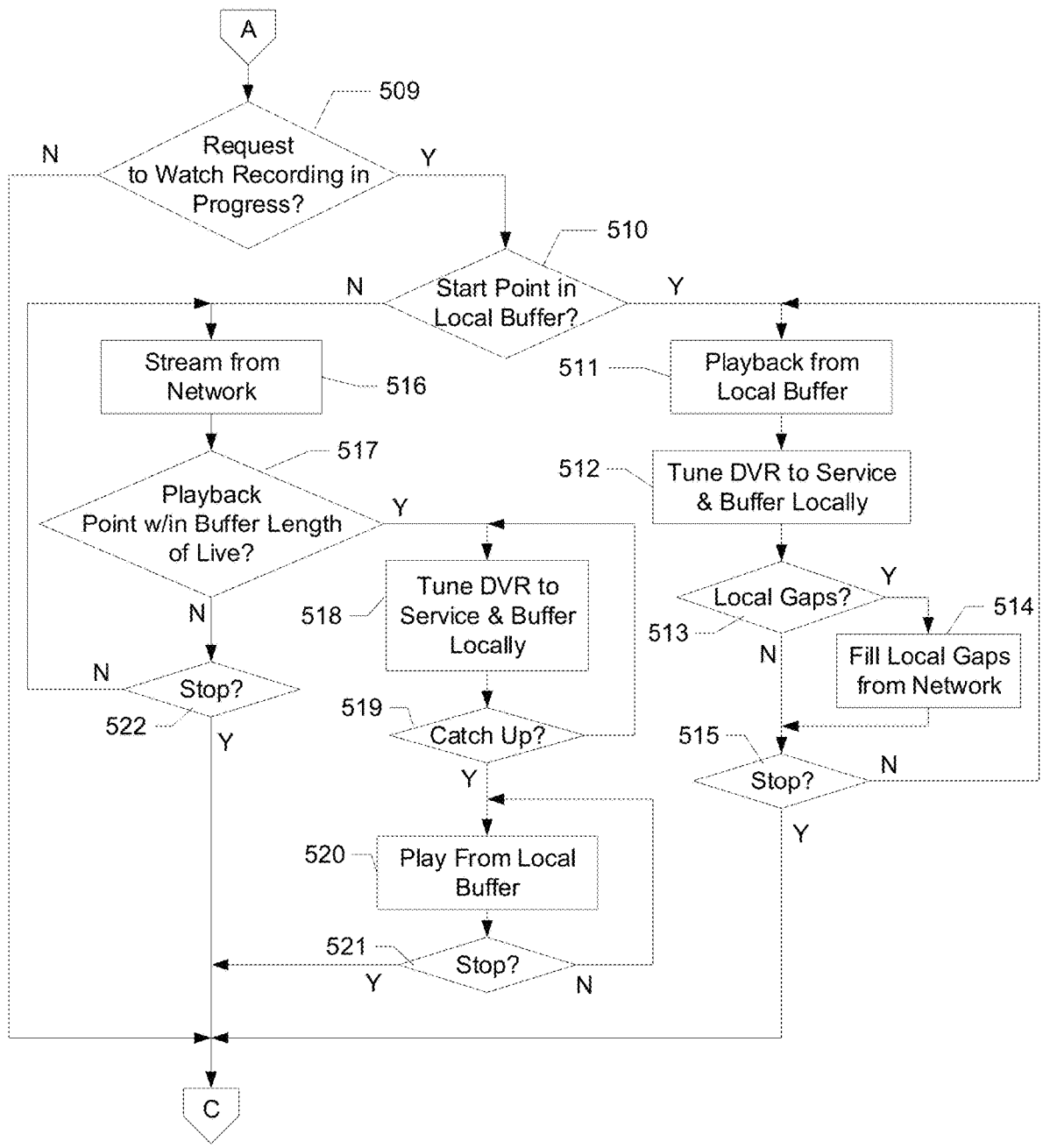
Figure 5C:
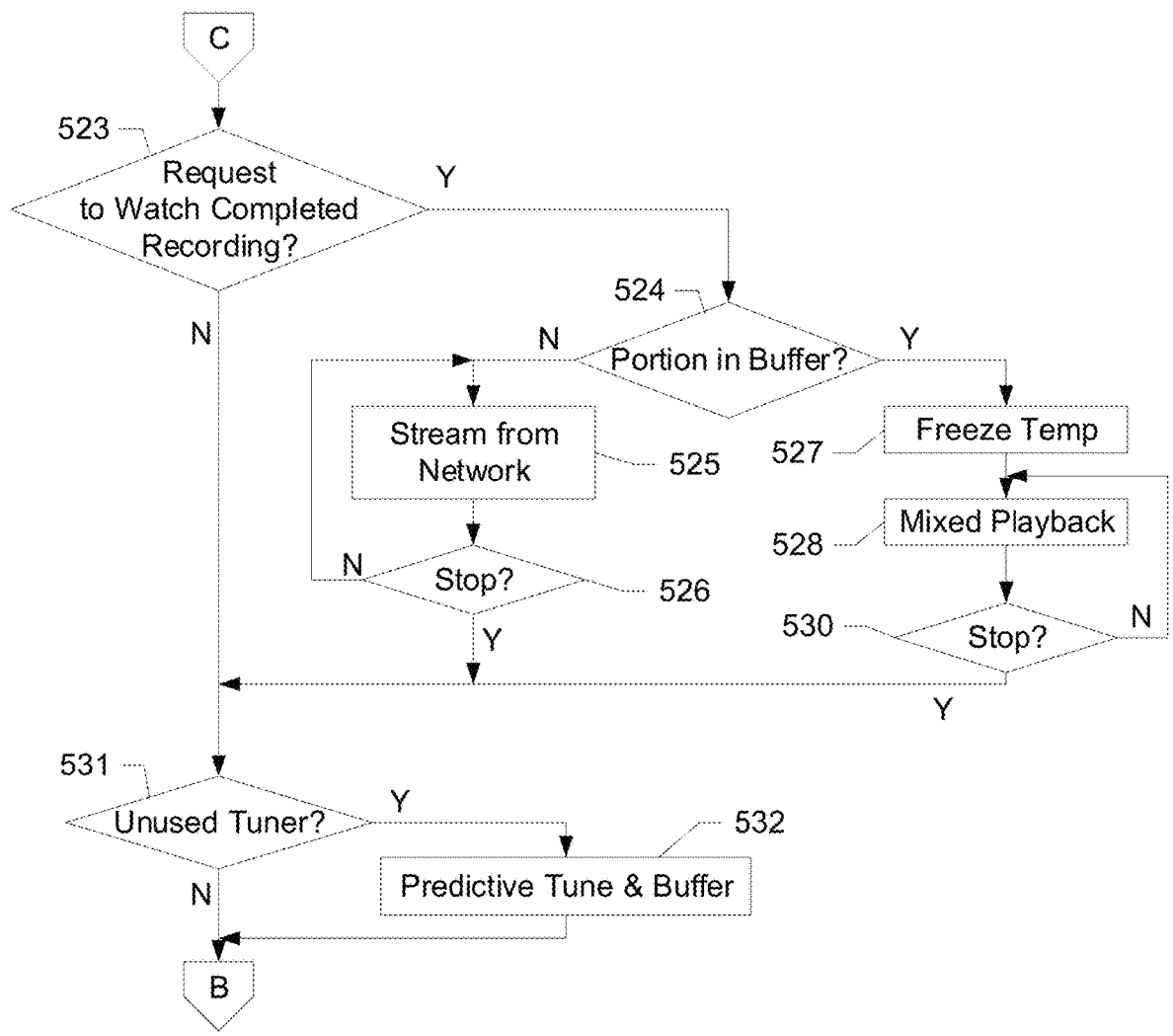

FIGS. 5A-C illustrate example methods for how this can be accomplished. The steps illustrated may be performed by the content server 106 offering network recording options to users in conjunction with the user's DVR 113, for example, or other content access or recording devices. In step 501, a computing device such as the content server 106 may allocate network storage space to individual users and/or their particular devices. For example, a given household may have a single account with a service provider, and may be allocated a set amount (e.g., 100 hours, 100 GB, etc.) of network storage 301 space on which content may be recorded. The allocation, and amount consumed per account, may be stored in a database at the content server 106 or another computing device.

In step 502, the content server 106 may determine whether it has received a request to schedule a future recording of a program. The recording request itself may initially be entered by a user, for example, by viewing an electronic program guide (EPG) on a requesting device such as a DVR 113, computer, smartphone, or other access device, and by selecting a listed program for recording. The requesting device may prompt the user to select whether the recording should be made locally or on the network storage 301 in the user's allocation, and if it is a network recording request, the requesting device may transmit a recording request to the content server 106. The request may identify the requesting device and/or the account whose allocation is to be used to record the program, as well as an identification of the program to be recorded and any additional desired recording parameters (e.g., record quality, time limit, pre-program and post-program added time, etc.).

If such a request has been received, then the content server 106 may proceed to step 503, and set a network record schedule for the program. The server 106 may maintain a schedule of programs that are to be recorded for users, as well as an identification of the allocations and recording parameters, and monitor scheduled transmission of programs.

In step 504, the server 106 may determine whether it is time to record a program for a user. The server 106 may maintain a schedule listing of all programs that are going to be transmitted (e.g., multicast, broadcast, airing, etc.), and monitor the current time. When the time comes for a program to be recorded for a user, the server may proceed to step 505, and initiate the recording of the requested program. The recording itself may involve recording by a memory device, such as the network storage 301, simultaneously (as needed) recording copies of requested programs into various users' allocated storage spaces. Of course, the allocated spaces need not be specific predefined memory locations, but can instead simply be a total storage amount, and the network storage device 301 may manage its own storage in any desired manner through, for example, file allocation tables, data striping, pointers, and any other desired memory management approach.

In addition to initiating the recording of a program at the network storage 301, the content server 106 may also determine, in step 506, whether the requesting user's DVR 113 has an available unused tuner. Each DVR 113 may be associated with or physically contain a predetermined number of tuner circuits that can be used to tune to and decode content transmitted from a provider, e.g., the central office. A tuner circuit may include, for example, a quadrature amplitude modulation (QAM) frequency tuner and associated decoder hardware/software configured to locate, receive and decompress/decode/decrypt received content (e.g., programs containing video, audio or both, Internet data, etc.). Such a tuner may be "unused" when it is not currently being used to tune to a program for recording and/or viewing. For example, the user may have left the DVR 113 in an "on" state, but might not be actually using it to record or watch anything (e.g., the DVR 113 may have detected that the associated television or video display device is turned off, and the DVR 113 is not otherwise recording content). A DVR 113 might have multiple tuners, so even if one is currently in use, another tuner might be unused.

The determination of an available tuner can be made in a variety of ways. For example, the server 106 may transmit a message to the requesting user's DVR 113, or to another device associated with the DVR that comprises the tuners, requesting the status of its tuners. The DVR 113 can respond with a message indicating whether it currently has an available unused tuner. Alternatively, the DVR 113 may automatically report its own local tuner usage to the content server 106 periodically, for example, when the user turns on a connected video display device, changes channel, or sets a recording. In this alternative, the server 106 may already have information identifying the usage status of the various tuners for the requesting user's DVR 113.

If the content server 106 determines that the requesting user's DVR 113 has an available unused tuner, the server 106 may proceed to step 507, and transmit an instruction to the DVR 113, or an associated device. The instruction may command the DVR 113 to tune its unused tuner to a predetermined service (e.g., frequency, channel, etc.) that is carrying the program that is currently being recorded at the network storage (by virtue of the recording initiated in step 505). The instruction may simply be a tuning command, without instructing the DVR to separately record the program (e.g., if the DVR also had a local DVR hard drive that the user can fill). The DVR 113 may respond by tuning itself to the predetermined service, and by virtue of the tuning, the DVR 113 can proceed to step 508, in which the DVR 113's own temporary buffer 303 can begin to buffer the program that the user has requested to be recorded at the network storage 301.

In step 509, the server 106 may determine whether it has received a request from the user to view a previously-scheduled recording while the recording is in progress. The request to view, like the request to record, can be received in a variety of ways. For example, a user of the DVR 113 may access the server 106, view a listing of content that the user has recorded on the network storage 301, and choose a program for viewing. The user may do this at any time, even if the program being recorded has not yet finished recording.

If the user has made such a request, the server may proceed to step 510, and determine in step 510 whether the beginning playback position in the recorded content is stored in the DVR 113's temporary buffer. The starting playback position can be the beginning of the program by default, although in some embodiments a different starting playback position can be identified by the user, the user's device (e.g., the DVR 113), and/or the content server 106.

If the start position for the playback happens to be in the DVR's temporary buffer 303, the server 106 can instruct the DVR 113, in step 512, to begin reading the recorded program's contents from its temporary buffer 303 and playing back those contents to the user (or delivering the locally-recorded contents to the user's playback device). Instructions for step 512 may also reside locally at the DVR 113. The server 106 can also instruct the DVR 113 to tune to the service carrying the program being recorded (e.g., tuning to the QAM, radio frequency channel, digitally-encoded logical channel, etc.), and to cause the DVR 113's temporary buffer 303 to begin buffering the service and its program. Accordingly, the user's desired program may be recorded both at the network storage 301 and in the temporary buffer 303.

In step 513, the server 106 (or the DVR 113) may determine whether there are any gaps in the temporary buffer 303's copy of the program being recorded and viewed. Referring back to the FIG. 4A example, the temporary buffer 303 may be missing the portions of "Program 2" that occurred when the user changed channels to watch "Program 1." Alternatively, the temporary buffer 303's copy of the program contents may be missing portions for other reasons as well (e.g., local memory management by the DVR 113 resulting in missing information, poor signal resulting in loss of portions, etc.).

If any such gaps are found, then the server 106 can initiate a download 514 to the DVR 113 to transmit the missing portion(s) and fill in the gaps in the temporary buffer 303's copy. In some embodiments, the DVR 113 or associated device may identify the missing portions (e.g., identifying time segments that are missing or of poor quality), and send an upstream message to the server 106 requesting those missing portions. The server 106 can respond with a downstream transmission containing the missing material. This downstream transmission may be sent using a higher bandwidth (or compression) stream, such that the transmission can occur faster than playback would (e.g., missing data for a five-minute gap would take less than five minutes to download). In some embodiments, this local buffer gap-filling can occur prior to initiation of actual local playback, to help ensure a smooth viewing experience for the user.

Playback from the local copy can continue (or begin), and in step 515, the DVR 113 (or server 106) can determine if the playback should be stopped (e.g., if the user presses a "Stop" or "Pause" button on a handheld remote control). If not, the process can return to step 511, and playback can continue. If playback is to stop, then the playback can stop, and the process can proceed to step 523 discussed further below.

Returning to step 510, if the playback start point is not in the temporary buffer 303 (e.g., if the start time was more than an hour ago for an hour-long buffer, or if a gap exists as discussed above), then the server 106 can proceed to step 516, and stream the requested content from the network storage 301 (e.g., from the user's allocation) to the DVR 113 or another device for playback.

In step 517, the server 106 can determine an amount of playback time that exists in the program between the current playback point and the current live transmission, and compare that with a size limit of the temporary buffer 303. For example, if the user's playback of the recorded program has just begun from the start of the program, but the current live transmission of the program is in its forty-fifth minute (e.g., the user has requested to watch his/her recording of an episode of "Mad Men" forty-five minutes after it started, but before the program has ended), then this amount of playback time would be forty-five minutes.

The server 106 can then determine the size limit of the temporary buffer 303 in terms of time. For example, if the temporary buffer 303 is a one-hour buffer, then the limit would be one hour. If the buffer 303 were limited by data size instead, then the server 106 may determine how much time the buffer can hold, using the data rate of the requested program or service carrying the program, and use that as the time limit.

If the playback time until the live time is less than the time and size limit of the temporary buffer 303, then the server 106 can proceed to step 518, and instruct the DVR 113 to tune to the service carrying the in-progress program that the user has requested to watch while it is being recorded at the network storage (and also at the local storage, if the determination in step 506 had a free tuner). The recording of the program for the requesting user may then include the automatic buffering of the program in the user's temporary buffer 303. The server 106 (or DVR 113) can also retain in memory an identification of the temporary buffer start time (e.g., program time (e.g., ten minutes into the show) or absolute time (4:30:25 pm Nov. 15, 2010)) at which this tuning and temporary buffering occurred.

In step 519, the server 106 (or DVR 113, etc) can determine whether the current playback time of the streamed program has caught up to the contents in the temporary buffer. To make this determination, the server 106 may compare a current program playback time, which can be a program time (e.g., the time within the program, such as ten minutes into the program, that is currently being streamed to the DVR 113) or an absolute time (e.g., the absolute time at which the current moment in the program was recorded) with the current time of the live transmission of the program (e.g., the current program time being aired, or the current absolute time).

If the playback time has not yet caught up, or reached the temporary buffer start time, then the server 106 and/or DVR 113 can return to step 518, with streaming and buffering continuing as stated above. Alternatively (not shown), the server 106 may determine if the user has requested to stop the playback. If so, the process may skip ahead to step 523, discussed further below.

If the playback time has caught up and reached the temporary buffer start time, then the server 106 can instruct the DVR 113 to continue further playback from the temporary buffer 303, instead of the stream. After the DVR 113 or associated device successfully switches to playing back from the temporary buffer 303 (it can send a confirmation of this to the server 106), the server 106 can tear down, or otherwise stop, the stream it initiated in step 516. The playback can then remain at step 520, playing back from the temporary buffer 303, until playback is stopped in step 521.

In step 517, if the difference between the current playback point and the live transmission point is not within the temporary buffer length, then the server 106 can proceed to step 522 and determine if playback should be stopped. If playback should not be stopped, then the process can return to step 516, with playback continuing using the stream of content from the network storage 301.

If playback is stopped in steps 515, 521 or 522, or if the user did not request to watch an in-progress program recording in step 509, the server 106 may proceed to step 523, and determine if the user requested to watch a program that has completed recording. For example, the user may have previously requested to record the nightly news on the network storage, and is now ready to watch the recording after coming home from work. If the user makes such a request, the process can proceed to step 524, and the server 106 (and/or DVR 113) can determine if any of the requested program remains in the temporary buffer 303 (for example, if the user had an available tuner in step 506 that was tuned to the news in step 507 when the news was originally recorded). If none of the program remains in the temporary buffer 303 (e.g., the program has since been overwritten with other content), then the server 106 can proceed to step 525 and stream the requested program to the DVR 113 from the user's allocation in the network storage 301. Playback from the stream can continue until stopped in step 526.

If, however, a portion of the requested program remains in the temporary buffer 303, the process can proceed to step 527, and the recording by temporary buffer 303 can be frozen or paused. Freezing or pausing the recording of by the temporary buffer 303 can help prevent the overwriting of portions of the recorded program that the user wishes to view.

In step 528, the DVR 113 and/or server 106 can then conduct a mixed playback of the program. Portions of the recorded program that are available in the temporary buffer 303 may be retrieved from the buffer 303 for playback, while portions that are missing from the buffer are retrieved as needed from the server 106. For smooth presentation, the retrieval of program contents from either the buffer 303 or network storage 301 can be done prior to playback. The mixed playback can continue in step 528 until playback is stopped in step 529.

If playback is stopped in steps 526 or 529, or if the user did not request to watch a completed recording in step 523, the server 106 can proceed to step 530, and determine if the DVR 113 happens to have an unused tuner. If there is an available tuner, then the server 106 can proceed to step 532, and determine if a particular program should be predictively tuned. To conduct such predictive tuning, the server 106 can consult a profile database history of the particular user or DVR 113's viewing habits and preferences, identifying programs, services, etc. that are most commonly watched, and can instruct the DVR 113 to tune to the program, service, or channel that is most likely to be of interest to the user. As one factor in this analysis, the server 106 can use the time duration of the DVR 113's temporary buffer 303. For example, the server 106 can set a time range criterion that extends from the current time to a future time based on the time duration of the buffer 303 (e.g., one hour in the future, if the buffer 303 is one hour long). By predictively tuning to the most-likely-to-be-viewed program or service, the temporary buffer 303 increases the odds that the user may happen to request to record and view a program that is already buffered locally, thereby potentially minimizing the need for a new stream for the playback.

The features illustrated in the figures and discussed herein are merely examples, and can be altered, combined, subdivided, in any desired manner to still achieve results described herein. For example, the various steps may be described as being performed by the content server 106 or the DVR 113, but the performance can be redistributed to other devices and/or servers as desired.

As another example, the FIG. 5C example includes a mixed playback in step 528. In alternative embodiments, this step can involve the DVR 113 assembling a copy of the recorded program by first copying the portions from its temporary buffer 303 to another memory location, and then requesting additional streaming from the network storage 301 to obtain the missing portions, prior to playing the content, similar to the gap-filling in steps 513 and 514. In some embodiments, the freezing of the temporary buffer 303 can be omitted, if the portions of the program that were in the buffer 303 are copied to some other memory accessible to the DVR 113, such as a portion of its hard drive.

In some embodiments, the temporary buffer 303 might be configured to automatically reset with each channel change (e.g., the FIG. 4B example), in which case the gap-filling in steps 513 & 514 may be omitted since such gaps might not exist in the buffer.

In some embodiments, the temporary buffer 303 can be configured to selectively record (or omit recording) certain predetermined programs and/or services. For example, a user could specify that certain programs should not be buffered, even if the user tunes to those programs.

In some embodiments, the DVR 113 may contain multiple tuners and only one temporary buffer 303. The user of such a DVR 113 can prioritize which of the tuners will be buffered in the temporary buffer 303. Accordingly, the user may indicate that tuner 1 should be the one buffered, even if the user chooses to view contents from tuner 2. This may be helpful, for example, if the user has a limited number of tuners, and wishes to use the temporary buffer 303 as a temporary additional tuner. Of course, the buffer 303 may be left to only record content received on one of the other actual tuners, but in some embodiments, multiple services can be transmitted on a common QAM channel A single RF tuner circuit can receive that QAM channel, and can isolate one of the services carried on that channel for one of the DVR 113's decoders, but the temporary buffer 303 may contain its own decoder, and can record content that was also sent on the same QAM channel.

In some embodiments, a program recording conflict may arise if the user wants to record multiple programs that are airing simultaneously, and a conflict resolution process may select one program over the other for recording. The user can specify that the contents for the program that loses out on the recording priority can be decoded and stored in the temporary buffer 303, provided that signal carrying the losing program is still tuned using one of the DVR 113's tuners (e.g., if the losing program was multiplexed into the same QAM channel as another requested program).

The various features described above are merely nonlimiting examples, and can be rearranged, combined, subdivided, omitted, and/or altered in any desired manner. The true scope of this patent should only be defined by the claims that follow.

The invention claimed is:

1. A method comprising:
receiving, by a networked digital video recorder (nDVR) computing device remote from a digital video recorder (DVR), a request to record a future scheduled program;
causing at least some of the program to be recorded by an nDVR storage;
receiving a request for playback of the program; and
causing, based on the request for playback of the program, playback of the program using a first portion of the program recorded at the nDVR storage and a second portion of the program recorded in a temporary buffer of the DVR.

2. The method of claim 1, wherein the request for playback is received while the at least some of the program is being recorded by the nDVR storage.

3. The method of claim 1, further comprising:
determining that a playback start point of the program is part of the second portion of the program recorded in the temporary buffer of the DVR,
wherein the causing playback comprises causing playback of the program starting at the playback start point from the temporary buffer of the DVR.

4. The method of claim 1, further comprising:
determining that a playback start point of the program is not part of the second portion of the program that is recorded in the temporary buffer of the DVR,
wherein the causing playback comprises causing playback of the program to start by using the first portion of the program recorded in the nDVR storage, and causing switching to playback using the second portion of the program recorded in the temporary buffer of the DVR.

5. The method of claim 1, further comprising:
determining a gap in the second portion of the program recorded in the temporary buffer of the DVR; and
determining, based on the gap, the first portion of the program.

6. The method of claim 1, wherein the method further comprises:
determining a time difference between a live program time and a playback start point of the program recorded in the temporary buffer; and
causing, based on a determination that the time difference is smaller than a limit of the temporary buffer of the DVR, the DVR to tune to the program and the temporary buffer to record a further portion of the program.

7. The method of claim 1, further comprising:
causing, based on a determination that the DVR has an unused tuner, the DVR to tune the unused tuner to the program while the at least some of the program is being recorded by the nDVR storage.

8. A method comprising:
receiving a playback request associated with a program and associated with a user device; and
based on the playback request:
sending, from a storage device to the user device, a first portion of the program;
causing the user device to record a second portion of the program based on a comparison of:
a storage amount associated with the user device; and
a difference between a current point in the program and a playback start point of the program; and
causing playback of the program using the first portion of the program sent from the storage device and using the second portion of the program that was recorded by the user device.

9. The method of claim 8, wherein the playback request is received while the program is being recorded by the storage device.

10. The method of claim 8, further comprising:
determining that a playback start point of the program is not recorded by the user device,
wherein the causing playback comprises causing playback of the program to start by using the first portion of the program sent by the storage device, and causing switching to playback using the second portion of the program recorded by the user device.

11. The method of claim 8, further comprising:
causing, based on a determination that the user device has an unused tuner, the user device to tune the unused tuner to the program while the program is being recorded by the storage device.

12. The method of claim 8, wherein the causing the user device to record the second portion of the program comprises causing the user device to record the second portion of the program via a temporary buffer.

13. The method of claim 8, wherein the causing the user device to record the second portion of the program comprises causing the user device to record the second portion of the program while the user device is receiving, from the storage device, the first portion of the program.

14. The method of claim 8, wherein the causing the user device to record the second portion of the program based on the comparison comprises:
causing, based on the difference being smaller than the storage amount, the user device to record the second portion of the program.

15. A method comprising:
receiving, while a program is being recorded by a storage device, a request associated with the program and associated with a user device; and
based on the request:
causing a first portion of the program to be sent from the storage device to the user device for presentation;
causing the user device to record a second portion of the program based on a comparison of:
a storage amount associated with the user device; and
a difference between a current point in the program and a playback start point of the program; and
causing to be presented the first portion of the program received from the storage device and the second portion of the program recorded by the user device.

16. The method of claim 15, further comprising:
determining that a playback start point of the program is not recorded by the user device,
wherein the causing the second portion of the program to be presented is performed after the causing the first portion of the program to be presented.

17. The method of claim 15, wherein the causing the user device to record the second portion of the program comprises causing the user device to record the second portion of the program via a temporary buffer.

18. The method of claim 15, wherein the causing the user device to record the second portion of the program comprises causing the user device to record the second portion of the program while the user device is receiving, from the storage device, the first portion of the program.

19. The method of claim 15, wherein the causing the user device to record the second portion of the program based on the comparison comprises:
causing, based on the difference being smaller than the storage amount, the user device to record the second portion of the program.

20. The method of claim 15, wherein the request is received while the program is being recorded by the storage device.

21. A networked digital video recorder (nDVR) computing device comprising:
one or more processors; and
memory storing instructions that, when executed by the one or more processors, cause the nDVR computing device to:
receive a request to record a future scheduled program;
cause at least some of the program to be recorded by an nDVR storage;
receive a request for playback of the program; and
cause, based on the request for playback of the program, playback of the program using a first portion of the program recorded at the nDVR storage and a second portion of the program recorded in a temporary buffer of a digital video recorder (DVR), wherein the nDVR computing device is remote from the DVR.

22. The nDVR computing device of claim 21, wherein the instructions, when executed by the one or more processors, further cause the nDVR computing device to:
determine that a playback start point of the program is part of the second portion of the program recorded in the temporary buffer of the DVR; and
cause the playback by at least causing playback of the program starting at the playback start point from the temporary buffer of the DVR.

23. The nDVR computing device of claim 21, wherein the instructions, when executed by the one or more processors, further cause the nDVR computing device to:
determine that a playback start point of the program is not part of the second portion of the program that is recorded in the temporary buffer of the DVR; and
cause the playback by at least:
causing playback of the program to start by using the first portion of the program recorded in the nDVR storage; and
causing switching to playback using the second portion of the program recorded in the temporary buffer of the DVR.

24. The nDVR computing device of claim 21, wherein the instructions, when executed by the one or more processors, further cause the nDVR computing device to:
determine a gap in the second portion of the program recorded in the temporary buffer of the DVR; and
determine, based on the gap, the first portion of the program.

25. The nDVR computing device of claim 21, wherein the instructions, when executed by the one or more processors, further cause the nDVR computing device to:
determine a time difference between a live program time and a playback start point of the program recorded in the temporary buffer; and
cause, based on a determination that the time difference is smaller than a limit of the temporary buffer of the DVR, the DVR to tune to the program and the temporary buffer to record a further portion of the program.

26. An apparatus comprising:
one or more processors; and
memory storing instructions that, when executed by the one or more processors, cause the apparatus to:
receive a playback request associated with a program and associated with a user device; and
based on the playback request:
send, from a storage device to the user device, a first portion of the program;
cause the user device to record a second portion of the program based on a comparison of:
a storage amount associated with the user device; and
a difference between a current point in the program and a playback start point of the program; and
cause playback of the program using the first portion of the program sent from the storage device and using the second portion of the program that was recorded by the user device.

27. The apparatus of claim 26, wherein the instructions, when executed by the one or more processors, further cause the apparatus to:
determine that a playback start point of the program is not recorded by the user device; and
cause the playback by at least:
causing playback of the program to start by using the first portion of the program sent by the storage device; and
causing switching to playback using the second portion of the program recorded by the user device.

28. The apparatus of claim 26, wherein the instructions, when executed by the one or more processors, cause the apparatus to:
cause the user device to record the second portion of the program via a temporary buffer.

29. The apparatus of claim 26, wherein the instructions, when executed by the one or more processors, cause the apparatus to:
cause the user device to record the second portion of the program while the user device is receiving, from the storage device, the first portion of the program.

30. An apparatus comprising:
one or more processors; and
memory storing instructions that, when executed by the one or more processors, cause the apparatus to:
receive, while at least a first portion of a program is being recorded by a storage device, a request associated with the program and associated with a user device; and based on the request:
　　cause the first portion of the program to be sent from the storage device to the user device for presentation;
　　cause the user device to record a second portion of the program based on a comparison of:
　　　a storage amount associated with the user device; and
　　　a difference between a current point in the program and a playback start point of the program; and
　　cause to be presented the first portion of the program received from the storage device and the second portion of the program recorded by the user device.

31. The apparatus of claim 30, wherein the instructions, when executed by the one or more processors, further cause the apparatus to:
　determine that a playback start point of the program is not recorded by the user device; and
　cause the second portion of the program to be presented after the first portion of the program is sent to the user device.

32. The apparatus of claim 30, wherein the instructions, when executed by the one or more processors, cause the apparatus to:
　cause the user device to record the second portion of the program via a temporary buffer.

33. The apparatus of claim 30, wherein the instructions, when executed by the one or more processors, cause the apparatus to:
　cause the user device to record the second portion of the program while the user device is receiving, from the storage device, the first portion of the program.

34. The apparatus of claim 30, wherein the instructions, when executed by the one or more processors, cause the apparatus to receive the request while the program is being recorded by the storage device.

35. A non-transitory computer-readable medium storing instructions that, when executed, cause a networked digital video recorder (nDVR) computing device to:
　receive a request to record a future scheduled program;
　cause at least some of the program to be recorded by an nDVR storage;
　receive a request for playback of the program; and
　cause, based on the request for playback of the program, playback of the program using a first portion of the program recorded at the nDVR storage and a second portion of the program recorded in a temporary buffer of a digital video recorder (DVR), wherein the nDVR computing device is remote from the DVR.

36. The non-transitory computer-readable medium of claim 35,
　wherein the instructions, when executed, further cause the nDVR computing device to:
　determine that a playback start point of the program is part of the second portion of the program recorded in the temporary buffer of the DVR; and
　cause the playback by at least causing playback of the program starting at the playback start point from the temporary buffer of the DVR.

37. The non-transitory computer-readable medium of claim 35, wherein the instructions, when executed, further cause the nDVR computing device to:
　determine that a playback start point of the program is not part of the second portion of the program that is recorded in the temporary buffer of the DVR; and
　cause the playback by at least:
　　causing playback of the program to start by using the first portion of the program recorded in the nDVR storage; and
　　causing switching to playback using the second portion of the program recorded in the temporary buffer of the DVR.

38. The non-transitory computer-readable medium of claim 35, wherein the instructions, when executed, further cause the nDVR computing device to:
　determine a gap in the second portion of the program recorded in the temporary buffer of the DVR; and
　determine, based on the gap, the first portion of the program.

39. The non-transitory computer-readable medium of claim 35, wherein the instructions, when executed, further cause the nDVR computing device to:
　determine a time difference between a live program time and a playback start point of the program recorded in the temporary buffer; and
　cause, based on a determination that the time difference is smaller than a limit of the temporary buffer of the DVR, the DVR to tune to the program and the temporary buffer to record a further portion of the program.

40. A non-transitory computer-readable medium storing instructions that, when executed, cause an apparatus to:
　receive a playback request associated with a program and associated with a user device; and
　based on the playback request:
　　send, from a storage device to the user device, a first portion of the program;
　　cause the user device to record a second portion of the program based on a comparison of:
　　　a storage amount associated with the user device; and
　　　a difference between a current point in the program and a playback start point of the program; and
　　cause playback of the program using the first portion of the program sent from the storage device and using the second portion of the program that was recorded by the user device prior.

41. The non-transitory computer-readable medium of claim 40, wherein the instructions, when executed, further cause the apparatus to:
　determine that a playback start point of the program is not recorded by the user device; and
　cause the playback by at least causing playback of the program to start by using the first portion of the program sent by the storage device, and causing switching to playback using the second portion of the program recorded by the user device.

42. The non-transitory computer-readable medium of claim 40, wherein the instructions, when executed, cause the apparatus to:
　cause the user device to record the second portion of the program via a temporary buffer.

43. The non-transitory computer-readable medium of claim 40, wherein the instructions, when executed, cause the apparatus to:
　cause the user device to record the second portion of the program while the user device is receiving, from the storage device, the first portion of the program.

44. A non-transitory computer-readable medium storing instructions that, when executed, cause an apparatus to:
　receive, while at least a first portion of a program is being recorded by a storage device, a request associated with the program and associated with a user device; and based on the request:
cause the first portion of the program to be sent from the storage device to the user device for presentation;
cause the user device to record a second portion of the program based on a comparison of:
a storage amount associated with the user device; and
a difference between a current point in the program and a playback start point of the program; and
cause to be presented the first portion of the program received from the storage device and the second portion of the program recorded by the user device.

45. The non-transitory computer-readable of claim 44, wherein the instructions, when executed, further cause the apparatus to:
determine that a playback start point of the program is not recorded by the user device; and
cause the second portion of the program to be presented after the first portion of the program is sent to the user device.

46. The non-transitory computer-readable medium of claim 44, wherein the instructions, when executed, cause the apparatus to:
cause the user device to record the second portion of the program via a temporary buffer.

47. The non-transitory computer-readable medium of claim 44, wherein the instructions, when executed, cause the apparatus to:
cause the user device to record the second portion of the program while the user device is receiving, from the storage device, the first portion of the program.

\* \* \* \* \*